United States Patent

Keady

[15] 3,698,771

[45] Oct. 17, 1972

[54] BRAKE WARNING SWITCH WITH BYPASS

[72] Inventor: Frederick D. Keady, Cleveland Heights, Ohio

[73] Assignee: The Weatherhead Company, Cleveland, Ohio

[22] Filed: Aug. 7, 1969

[21] Appl. No.: 848,321

[52] U.S. Cl. .............303/6 C, 188/151 A, 200/82 D, 303/84 A, 340/52 C

[51] Int. Cl. ..........B60t 8/26, B60t 11/34, B60t 17/22

[58] Field of Search.....303/84, 84 A, 6, 6 C; 200/82, 200/82.31; 340/52, 52 C; 92/51; 188/151.11, 152.11; 137/87, 98–101; 116/70; 60/54.5

[56] References Cited

UNITED STATES PATENTS

| | | | |
|---|---|---|---|
| 3,441,318 | 4/1969 | Bueler | 303/6 C |
| 3,448,230 | 6/1969 | Bueler | 303/6 C X |
| 3,450,443 | 6/1969 | Bueler | 303/6 C |
| 3,464,741 | 9/1969 | Falk | 303/6 C |

*Primary Examiner*—George E. A. Halvosa
*Assistant Examiner*—John J. McLaughlin
*Attorney*—McNenny, Farrington, Pearne and Gordon

[57] ABSTRACT

A dual pressure switch unit utilized in dual brake systems for motor vehicles includes a valving mechanism operable by a pressure differential to change the circuitry of one of the two dual systems. In a system utilizing a pressure reducing valve in the rear brakes, failure of the front brakes will operate the valve and switch unit to close the switch to actuate a signal and to bypass the pressure reducing valve to supply full pressure to the rear brakes. This valving action is produced by an opening in a central valve spool normally closed by a member which is restrained in the housing and moves away from a closed position against the opening when the valve member is moved axially by a pressure differential. Whenever the valve member is returned to a neutral position, the opening is closed to return the pressure reducing valve to the circuit.

10 Claims, 3 Drawing Figures

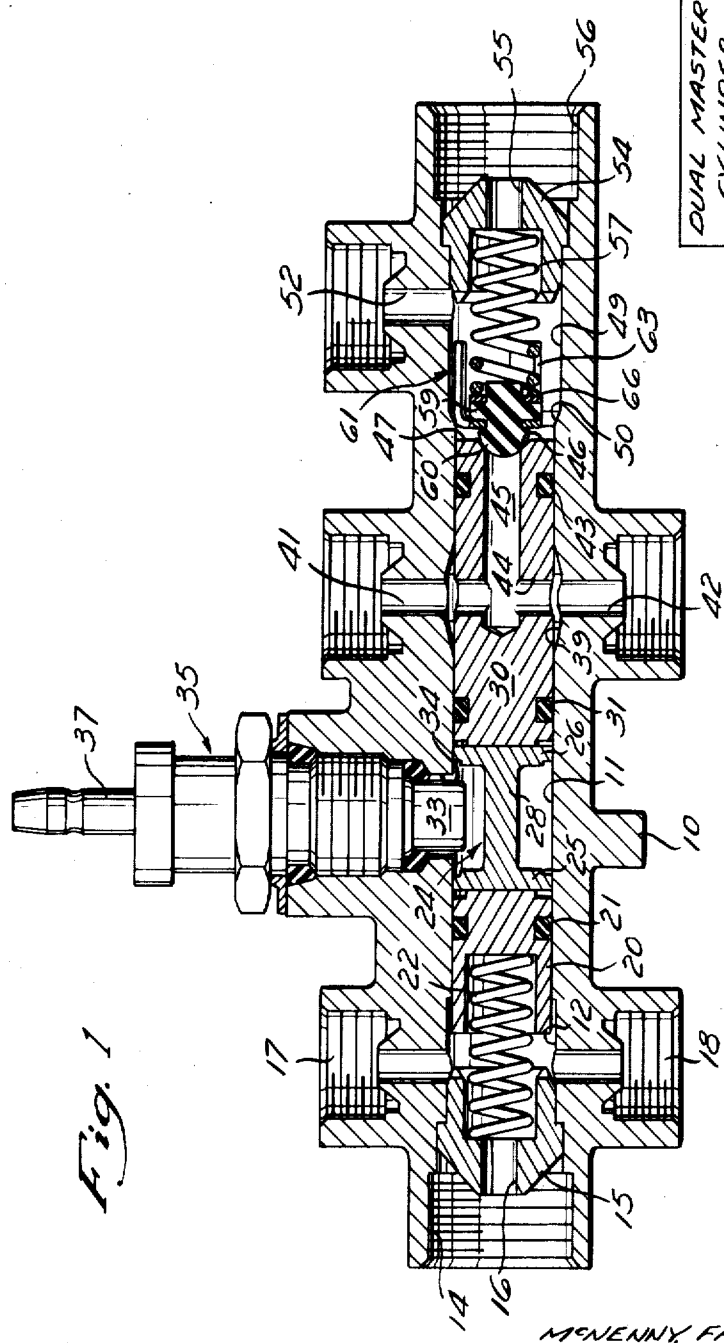
INVENTOR.
FREDERICK D. KEADY
BY
McNENNY, FARRINGTON, PEARNE & GORDON
R. H. Dickinson Jr.
ATTORNEYS

BRAKE WARNING SWITCH WITH BYPASS

BACKGROUND OF THE INVENTION

This invention relates generally to dual braking systems for motor vehicles and more particularly to sensing devices operable to detect a pressure unbalance between the two systems resulting from a failure in one system and to the incorporation of a valving action in such a device which is able to bypass a proportioning or pressure reducing valve in one of the brake systems to allow full applied brake pressure to be transmitted directly to the brakes by bypassing the pressure reducing valve in the event of failure while retaining the valve in the system when both brake systems are functioning in the normal manner.

With the advent of dual braking systems in automobiles, it was recognized that the advantages of such a system, that one set of brakes would remain operative in the event of the failure of the other system as a result of a leak or other failure, would require that some signal be provided to warn the driver of such failure. The signal is necessary because with the powerful characteristics of brakes used in modern motor vehicles, a driver might not notice the failure by virtue of any increased requirement in applied pressure or stroke of travel of the brake pedal. For these reasons various methods have been devised for providing a sensing device, usually in the form of an electrical switch, which is sensitive to a pressure differential between that in the two systems to operate a warning light or other device operable to warn the driver of the vehicle that a failure in one of the systems has taken place. The most common form of such a device is in the form of an electric switch utilizing a movable member exposed to the pressures in both systems such that the switch remains inoperative as long as the two systems are in substantial balance. However, when a pressure imbalance occurs between the two systems, as a result of a failure or leak in one of the systems, the device responds by closing an electric circuit to operate a warning device such as a signal light on the dashboard.

In brake systems where certain valves are used in one half of the system to modify the pressure between that coming from the master cylinder and that applied directly to the brake operating slave cylinders, it has been recognized that the pressure reduction produced by such valves is undesirable whenever a failure in the other half occurs. A most common application of such a system is in hybrid braking systems using a disc brake arrangement on the front and a self-energizing type drum brake on the rear wheels where, because of the different characteristics of the two brake units, premature lockup of the rear wheels will occur because of excessive pressure unless a proportioning valve is interposed between the master cylinder and the rear brake actuating motors to limit the pressure buildup in the actuating motors below that coming from the master cylinder whenever the pressure levels rise above a certain predetermined level. Thus, in such braking systems, while the front brakes receive pressure directly proportional to the force applied to the brake pedal, the rear brakes, before the pressure reaches a certain level, also receive a similar pressure, but if the pressure increases above that level, they receive a proportionally lower pressure resulting from the pressure reduction taking place in the proportioning valve.

In such a system, if the front brakes fail, there will be an increased pressure requirement in the rear brakes to produce the necessary braking action. Because of the presence of the proportioning valve in such a system, an even greater force is required at the brake pedal than would otherwise be necessary to actuate the rear brakes if they received the full pressure. Therefore, it has been recognized as desirable in such cases that the proportioning valve in the rear brake system be bypassed upon a failure of the front brakes so that the rear brakes receive the full pressure from the master cylinder regardless of the pressure level in the system. It has been recognized that the brake failure sensing device which detects the pressure loss in the front system and moves the valve member accordingly is suitable because of its existing construction to cause this valving action. Heretofore, it has been proposed that the moving valve or switch member, usually in the form of a spool sliding in an axial bore, include a valving land construction adapted to move across grooves in the bore in the housing to allow this bypass to occur through the axial bore so that fluid may flow directly from the master cylinder to the rear brake line by passing the proportioning valve. However, such construction generally required an excessively long axial movement of the spool as well as that the sealing member such as an O-ring move across a radial groove in the bore with possible resulting damage to the O-ring, so that the failure of the seal at this point would result in the bypassing of the necessary proportioning valve even when the brake system is functioning in the normal manner.

Accordingly, it is an object of the present invention to provide in a brake failure warning switch a novel valving device operable to bypass a pressure reducing device in one of the brake lines upon the occurrance of a pressure unbalance which gives improved operation and is of simple and dependable construction.

It is a further object of this invention to provide a bypassing arrangement as set forth in the preceding object which requires a minimal axial movement of the failure sensing portion of the unit to allow compact construction while providing high reliability of operation.

It is a further object of this invention to provide a device as set forth in the preceding objects in which the valving occurs by a passage through an axial spool which provides the failure sensing action, which passage is normally closed by a valve sealing member which is restrained in a passage in the housing so that upon movement of the sensing member away from the valve member, the axial passage to the sensing member is opened to bypass the proportioning valve.

Briefly, the foregoing and other and additional objects and advantages of the invention are achieved, according to the preferred embodiment of the invention, by providing a housing having an axial bore therein in which is mounted a sliding spool member. The spool member has a portion of reduced diameter at the center and sealing portions on each side of this reduced diameter portion. A switch contact projects radially into the axial bore adjacent the reduced diameter portion. Normally, the spool is held in the center position by means of springs at each end of the spool and one end of the spool is exposed to the pressure toward one side of the dual braking system such as the front brakes, while the other side is exposed to the pressure at the rear brakes. Normally, the pressure to the rear brakes bypasses the portion at its side of the spool member to go to a proportioning device and the flow from the proportioning device, which normally tends to reduce pressure, enters at a port, sealed from the remainder of the device by suitable seals on the spool, to pass around and across the spool and out to the rear brakes. The spool, in addition to the transverse passage allowing such flow, has a connected axial passage extending toward the inlet end from the master cylinder. This passage is normally sealed by a resilient poppet held in place by a cage mechanism guiding it in the bore and held by the centering spring which produces the necessary centering action on the spool. The cage is mounted in an enlarged bore portion of the housing and if a failure occurs in the front brakes, the increased pressure of the rear brakes causes the spool to move in a direction so that the projecting switch contact engages the spool to complete the electrical contact. However, such movement of the spool moves the axial bore portion away from the poppet which is restrained in its enlarge counterbore so that fluid can now flow past the poppet and into the axial bore to the transverse bore and directly to the rear brakes while bypassing the pressure reducing or proportioning valve device, which although remaining in the system, becomes inoperative because of the bypassing action.

The foregoing and additional objects and advantages of the invention are achieved in the preferred embodiment of the invention as set forth hereinafter in greater detail and shown in the accompanying drawings, in which;

FIG. 1 is a longitudinal cross-sectional view of the preferred embodiment of the invention;

FIG. 2 is a schematic diagram of a brake system incorporating the device of FIG. 1; and FIG. 3 is a perspective view of the poppet mounting device shown in FIG. 1.

Referring to the figures in greater detail, the device shown in FIG. 1 includes a housing 10 having an axial bore 11 extending lengthwise therein. At its left end, the axial bore 11 has an enlarged counterbore 12 terminating at its outer end in an internally threaded portion 14 adapted to receive a suitable hydraulic fitting. A fitting member 15 is mounted with a sealing fit within the counterbore 12 and includes an axial passage 16 opening into the interior of counterbore 12. Upper and lower radial outlets 17 and 18 are provided from the counterbore 12 which terminate at their outer ends in suitable fitting receiving portions as well known in the art. It will be understood that while the axial end fitting and the passage 16 may be considered the inlet and the passages 17 and 18 as outlets to the two separate front brakes, since all of these passages open commonly into the counterbore 12, they are interchangeable in function and any one may be used as an inlet with one or more of the remaining fittings used as an outlet.

In the left end of the axial bore 11 is located a piston member 20 carrying an O-ring seal 21 adapted to make sealing contact with the bore. A helical compression spring 22 is mounted between the fitting 15 and the piston 20 to produce a biasing force in the righthand direction on the piston 20 for the reasons described in greater detail hereinafter. It will be understood that the construction described hereinabove is representative of typical devices and otherwise forms no portion of the present invention.

At the righthand end of the piston 20, there is provided an intermediate member 24 having left and right end portions 25 and 26 respectively of substantial bore diameter adapted to make contact with the bore with a sufficiently tight fit as to insure electrical contact between the intermediate member 24 and the housing 10. Between the ends 25 and 26 is provided a reduced diameter portion 28 of substantially less diameter than that of the axial bore 11, and on the right end 26 a righthand piston 30 is slidably mounted in the bore 11 and is provided with an O-ring seal 31 to make sealing contact with the axial bore 11. An electrical contact stud 33 projects radially into the axial bore 11 through a transverse bore 34 and is carried in an insulated mounting by a suitable mounting assembly 35 mounted in a housing 10 which includes a terminal 37 for contact to the external warning device. It will be understood that stud 33 and terminal 37 are electrically insulated from the mounting member 35 and the housing 10 so that upon movement of the intermediate member 24 in either direction, the contact of the one of the end portions 25 and 26 will result in electrical contact between the stud 33 and the housing 10, to complete an electrical circuit between the housing, which is normally grounded, and the external terminal 37. The foregoing structure is substantially the same as that shown in the U.S. Pat. to Paul J. Miller, No. 3,374,322 granted Mar. 19, 1968, and apart from the disclosure herein forms no part of the present invention.

As seen in FIG. 1, the portion of the axial bore 11 contacted by the O-ring 31, the housing 10 has an enlarged annular port area 39 surrounding the axial bore 11 of sufficient diameter that fluid flowing through the enlarged annular port 39 may freely flow around and bypass the piston 30. Adjacent the enlarged annular port 39 the housing 10 is provided with an upper passage 41 and a lower passage 42 connecting with the enlarged annular port 39 and being provided at their outer ends with suitable fitting receiving portions for connection to the remainder of the brake system as described in greater detail hereinafter.

The piston 30 extends axially beyond the port 39 and is provided with a second O-ring 43 also adapted to make sealing contact with the axial bore 11. Thus, the O-rings 31 and 43 effectively isolate any fluid within the annular port 39 from the remainder of the portions in the axial bore 11. The piston 30 is provided with a transverse passage 44 normally in axial alignment with the housing passages 41 and 42 and opening to the exterior of the piston 30 intermediate the O-ring seals 31 and 43. The piston 30 also includes an axial passage 45 extending to the right from the transverse passage 44 and opening at the axial end 47 of piston 30 in a conical valve seat portion 46.

To the right of the piston 30 the axial bore 11 opens into an enlarged counterbore 49 which joins the axial bore 11 at a shoulder 50. The counterbore 49 has a radially extending passage 52 formed in the housing 10 and provided at its outer end with a fitting receiving portion for a hydraulic line as previously described. At its outer end, the counterbore 49 is closed by a fitting member 54 of similar construction to the fitting member 15 and provided with an axial passage 55 which opens into the threaded fitting receiving portion 56 formed on the housing 10. A helical compression spring 57 similar in construction to spring 22 engages the fitting member 54 in similar manner to the engagement between spring 22 and fitting member 15.

At the inner end of the counterbore 49, there is located a poppet 59, preferably formed of a suitable resilient material such as rubber or synthetic rubber resistant to the action of the fluids used in the system, and this poppet 59 includes a rounded sealing end portion 60 adapted to be received in sealing contact in the valve seat 46 formed on the piston 30. The poppet 59 is suitably carried and secured to a rigid carrier member 61 which is provided with a disc like central portion 62 having an aperture 65 therein within which the poppet 59 is received. The carrier 61 has a plurality of guide legs 63, shown, by way of example only, as being three in number, which extend axially from the central portion 62 and have an external diameter less than that of the counterbore 49 so as to slide axially freely therein, but greater than that of the axial bore 11. The central portion 62 is cut away intermediate the guide legs 63 as shown at 64 to allow fluid flow past the carrier member within the counterbore 49. The poppet 59 also carries a rigid washer member 66 which serves as an abutment for the spring 57 which, as can be seen in FIG. 1, biases the poppet 59 and carrier 61 toward the left so that the sealing end 60 closes off the valve seat 46 and such contact also biases the piston 30 toward the left in opposition to the biasing action of the spring 22. Thus, the springs 22 and 57 are arranged to be equal in biasing action when the intermediate member 24 is positioned so that the ends 25 and 26 are substantially evenly spaced on either side of the stud 33. Thus, the spring 57 normally provides a biasing action for the piston 30 to maintain the intermediate member 24 in the centered position as well as providing a biasing action for the poppet 59 so that the axial passage 45 and piston 30 are normally closed when the pressures at either end of the pistons 20 and 30 are substantially balanced.

However, in the event of a pressure unbalance which causes the pistons 20 and 30 and intermediate member 24 to move to the left, the carrier 61 will, by engagement between the guide legs 63 and the shoulder 50, have limited movement toward the left so that further movement of the piston 30 causes the valve seat 46 to move away from the poppet sealing section 60. The fluid within the counterbore 49 may then flow through the axial passage 45, the transverse portion passage 44 and into the enlarged annular port 39.

The aforegoing operation of the device is best understood in connection with the schematic diagram shown in FIG. 2. This arrangement shows the device of FIG. 1 in an automotive brake system having a dual or tandem master cylinder indicated at 68 which has a front brake line 69 and a rear brake line 70 extending therefrom and connected to separate sources of fluid pressure within the master cylinder 68 in a manner well known in the art. The front outlet line 69 may be connected to any one of the ports 14, 17 or 18, while one or more of the other ports may be connected to one or more front outlet lines 72 leading to the front brakes of the vehicle. Also, as shown in FIG. 2, a wire 74 may be connected from the terminal 37 to an indicator lamp 75 as may be provided on the dashboard of the vehicle, the other side of which lamp is connected by suitable means to a battery 76 which is grounded at 77, so that upon electrical connection between the intermediate member 24 and the stud 33, the lamp 75 may light to indicate that a pressure drop has occurred in either the front or rear brake line. Also, as shown in FIG. 2, the passage 52 is connected by suitable line 79 to a proportioning valve indicated at 81. This proportioning valve in turn is connected by a line 82 back to the passage 41, while the other passage 42 is connected to the rear brake line 84. The proportioning valve 81 may be of any construction well known in the art which provides for a pressure reduction across the valve so that the pressure in the rear brake line 84 is, under certain conditions, reduced below the pressure in the rear brake line 70 from the master cylinder. It will be understood that proportioning valve 81 and lines 71 and 82 may be built integrally in a single assembly with the housing 10 or may be separate, as is desired, since the particular construction of the proportioning valve forms no part of the present invention.

With this arrangement, since the poppet 59 normally closes off the axial passage 45, while the fluid from the master cylinder to the front brakes flows through the line 69 to the fitting 15 into the counterbore 12 and from there to one or the other of fittings 17 or 18 to the outlet lines 72, the fluid from the rear brake line 70 from the master cylinder has a somewhat different path. The fluid through line 70 enters the counterbore 49 through the passage 55 and fitting member 54 and from there normally flows outward through the passage 52 to the proportioning valve 81. Fluid from the proportioning valve 81 returns through line 82 to port 41 and then flows either through passage 44 in piston 30 or around the enlarged annular port 39 to port 42 and hence the rear brake line 84. It will be understood that since the pressure from the master cylinder is applied to its full extent to both ends of the assembly of the pistons 20 and 30 and intermediate member 24, these members will always be in balance, since the axial bore 11 is of uniform diameter, so that the intermediate member 24 never makes contact with the stud 33.

However, upon a loss of pressure in the front brakes, the piston assembly moves toward the left so that the right end 26 and intermediate member 24 moves into electrical contact with the stud 33 to light the lamp 75 in the manner indicated hereinabove. When this is done, the carrier 61 engages the shoulder 50 so that the movement of the piston 30 under the pressure present in the counterbore 49 moves the valve seat 46 away from the poppet sealing portion 60 so that now the fluid present at full pressure from the master cylinder within the counterbore 49 may flow through the axial passage 45 and from there through the transverse passage 44 into the enlarged annular port 39 from which it flows through the passage 42 directly to the rear brakes. Thus, upon loss of pressure in the front brake hydraulic system, the proportioning valve 41 and its attendant function of pressure reduction is bypassed so that the full pressure in the rear brake line 70 passes directly to the rear brake line 84 to increase the effective operation of the rear brakes which is necessary to provide maximum effective braking action after failure of the front brakes.

It should be noted that with the arrangement shown herein, should the pressure failure in the front brake system be eliminated, the action of the springs 22 and 57 causes the assembly of the pistons 20 and 30 to again center itself within the axial bore 11 so that as the piston 30 again moves to the right, the valve seat 46 moves into sealing contact with the sealing portion 60 of poppet 59 to close off the bypass axial passage 45 and again restore the flow of fluid to the rear brakes through the proportioning valve 81 so that the system again operates in the normal manner.

What is claimed is:

1. In a dual hydraulic system having first and second lines normally subject to substantially equal pressures, a sensing unit connected to said first and second lines to produce a signal responsive to a predetermined pressure differential between said lines and a pressure changing device in one of said lines for changing the pressure in said one line, the improvement comprising said sensing unit including a housing, a first member axially movable in said housing responsive to said predetermined pressure differential and having a neutral position when said pressures are balanced, a second member in said housing, said first and second members being constructed and arranged to provide relative movement between said first and second members by said predetermined pressure differential, cooperating valve means carried by said first and second members and operable by said axial movement of said first member from said neutral position to render said pressure changing device inoperable to change said pressure in said one line, said cooperating valve means including an internal axial passage extending from an end face of one of said members and a poppet axially sealingly engaging a portion of said end face surrounding said passage when said first member is in said neutral position, and said poppet being axially separated from said portion of said end face surrounding said passage by said axial movement of said first member from said neutral position to open said axial passage.

2. A device as set forth in claim 1 including spring means operable in said neutral position to axially bias said cooperating valve means into axially sealing engagement.

3. A device as set forth in claim 1 wherein said internal axial passage is in said first member.

4. A device as set forth in claim 1 including spring means operable in said neutral position to axially bias said poppet against said portion of said end face surrounding said passage when said first member is in said neutral position.

5. A device as set forth in claim 4 including stop means for limiting axial movement of said poppet toward said portion of said end face surrounding said passage to permit said separation of said poppet from said portion of said end face surrounding said passage by said axial movement of said first member from said neutral position.

6. A combination hydraulic brake warning device for use in dual brake systems including a housing, an axial bore in said housing, piston means slidably mounted in said axial bore and making sealing engagement with the walls thereof, signal sensing means operable by axial movement of said piston means in said bore in either direction from a neutral position, passage means at one end of said axial bore to admit fluid pressure therein, from a first brake line, a chamber at the other end of said axial bore at the other end of said piston means whereby said piston means is normally held in the centered position by a balanced fluid pressure at said passage means and said chamber, an inlet to said chamber connected to a second brake line, said chamber having an outlet passage, a pressure changing valve having an inlet and an outlet, said valve inlet being connected to said chamber outlet passage, a port in said housing intermediate the ends of said piston means, said port being connected to the outlet from said pressure changing valve and to the brake actuators, an internal axially extending passage in said piston means extending from an end face of said piston means in said chamber to said port, and a valve poppet in said chamber operable to axially engage a portion of said end face surrounding said passage to close said passage when said piston means is in a centered position, and said axial movement of said piston means in one direction away from said centered position axially separating said poppet from said portion of said end face surrounding said passage to open said passage to bypass said pressure changing valve.

7. A brake warning device as set forth in claim 6 including stop means for limiting axial movement of said poppet toward said portion of said end face surrounding said passage to permit said separation of said poppet from said portion of said end face surrounding said passage by said axial movement of said first member from said neutral position.

8. A brake warning device as set forth in claim 7 wherein said device includes a first spring at said one end of said axial bore biasing said piston means toward said chamber and a second spring in said chamber biasing said piston means away from said chamber, whereby both of said springs bias said piston means toward said centered position, said second spring also engaging said poppet to hold said poppet in axial engagement with said portion of said end face surrounding said piston means when said piston means is in said centered position.

9. A brake warning device as set forth in claim 8 wherein said stop means is an annular shoulder in said housing engageable by said poppet to limit movement of said poppet away from said chamber.

10. A brake warning device as set forth in claim 9 wherein said poppet comprises a rigid carrier in said chamber adapted to engage said annular shoulder to limit movement of said poppet away from said chamber and an elastomeric poppet member secured to said carrier and adapted to make axial sealing engagement with said portion of said end face surrounding said piston means.

* * * * *